Feb. 25, 1936.                W. A. BRECHT                2,032,112
                           AXLE GENERATOR DRIVE
                          Filed March 29, 1934           3 Sheets-Sheet 3
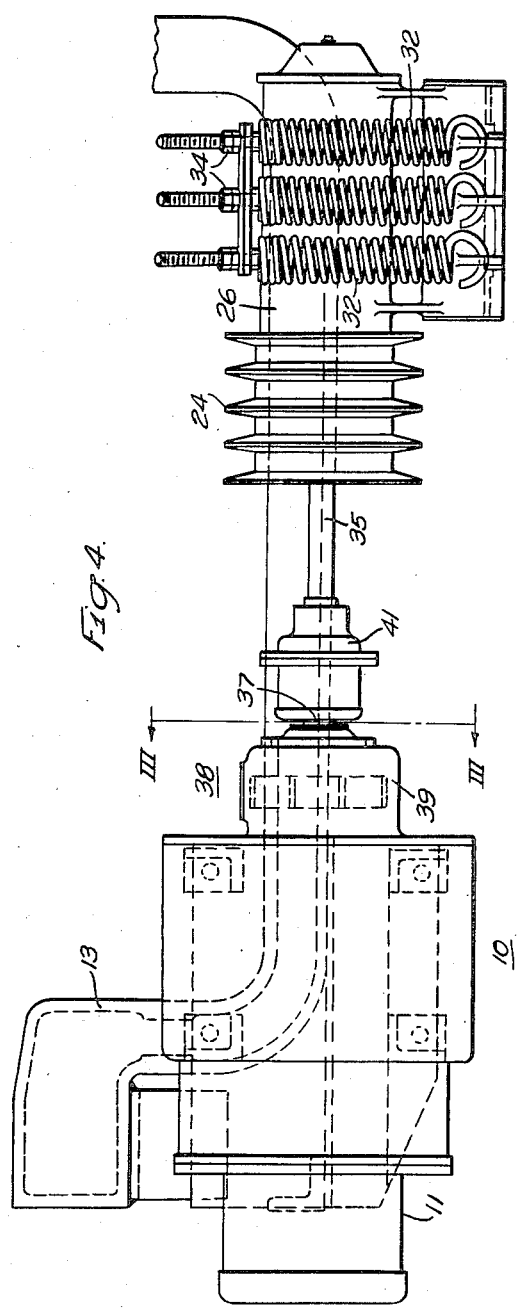
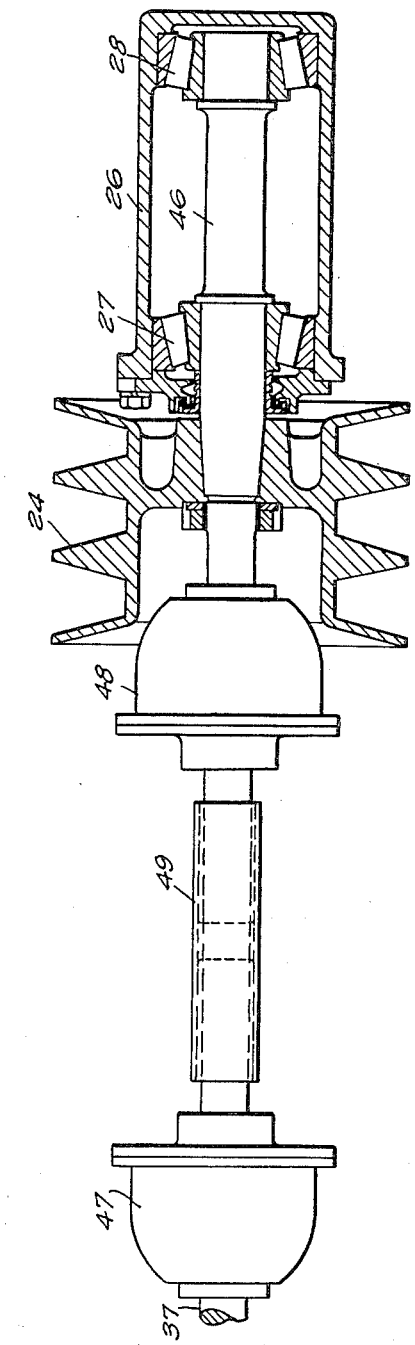
WITNESSES:                                   INVENTOR
E. A. M°Closkey                          Winston A. Brecht
                                             ATTORNEY Patented Feb. 25, 1936

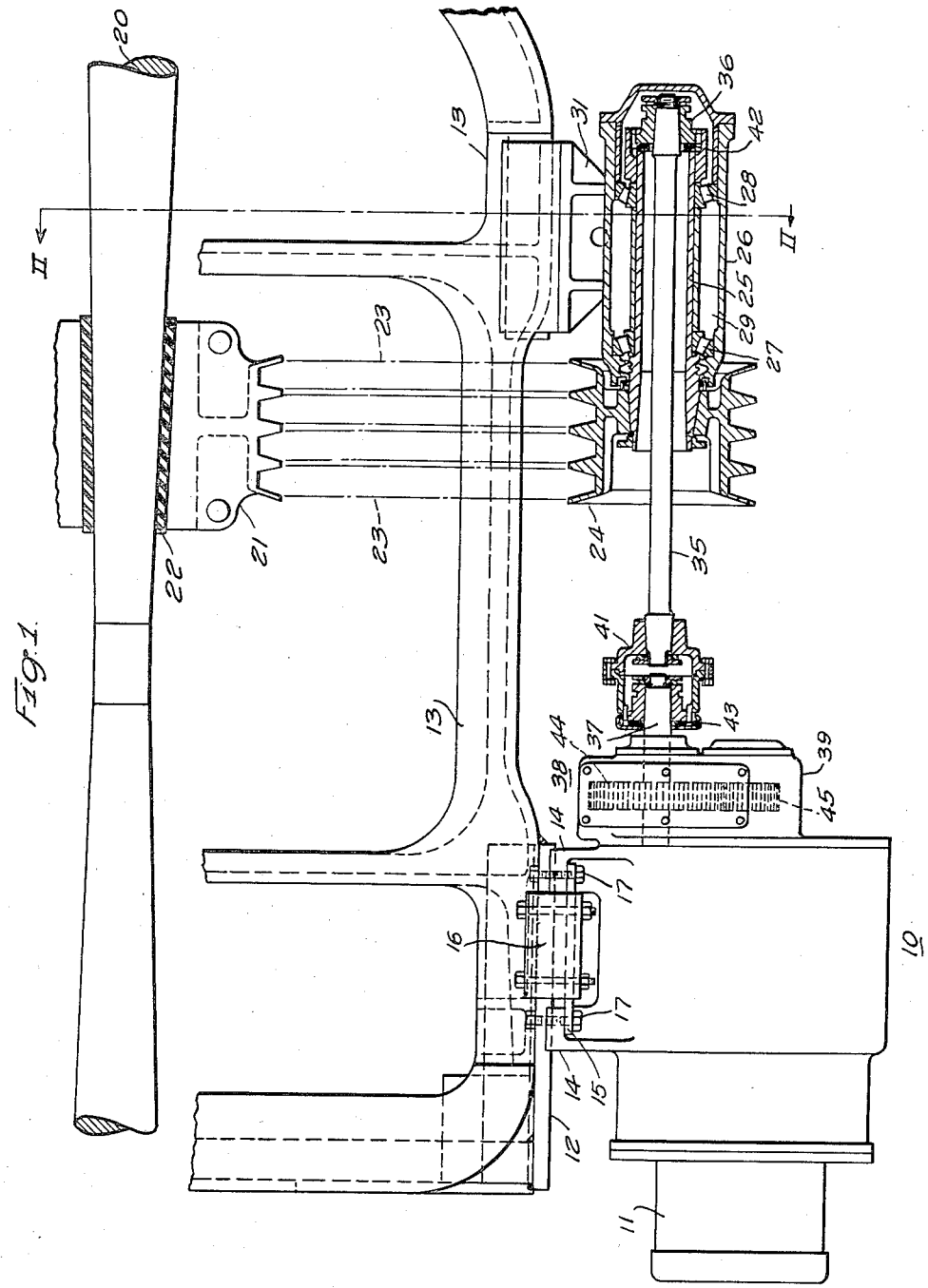

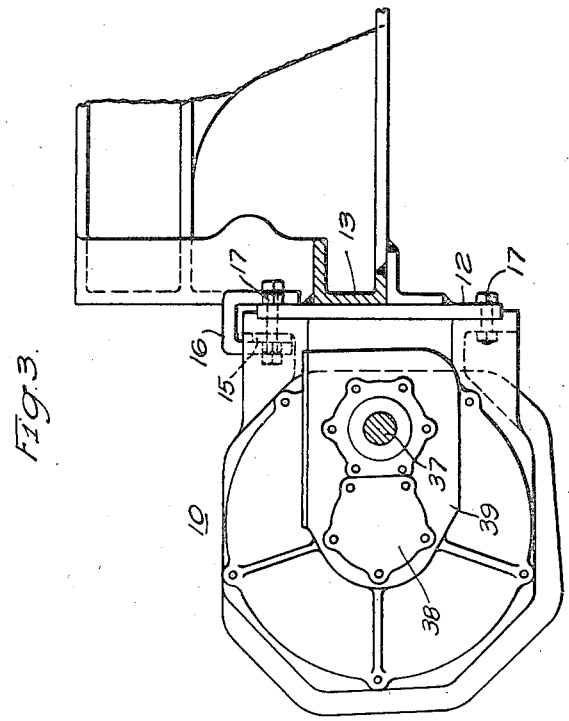
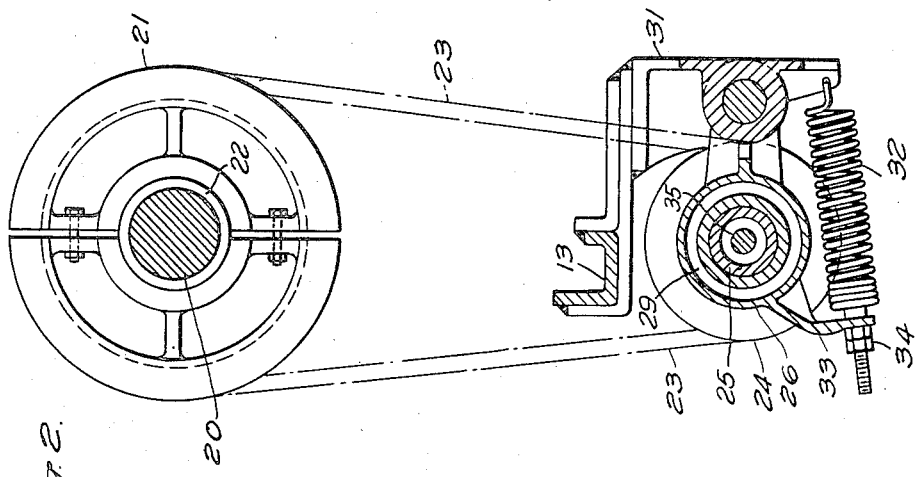

2,032,112

UNITED STATES PATENT OFFICE 2,032,112

AXLE GENERATOR DRIVE

Winston A. Brecht, Pittsburgh, Pa., assignor to Westinghouse Electric & Manufacturing Company, East Pittsburgh, Pa., a corporation of Pennsylvania Application March 29, 1934, Serial No. 717,983

6 Claims. (Cl. 105—105)

My invention relates, generally, to driving mechanism for railway axle-generators, and more particularly, to mechanisms wherein the generator for supplying energy for operating electrical equipment on a railway car is mounted on a car truck, and driven from a car axle.

Heretofore, in railway cars wherein the generator driving means has been the car axle, the generator has usually been suspended underneath the car body and directly driven by a belt connecting the generator with a pulley on the car axle. However, the size of the generator and the pulleys is limited by track clearances and with the advent of air-conditioning apparatus for railway cars, which requires additional power, it has been found impracticable to utilize this method to drive a generator of a size that can be mounted in the space available, at a speed which will develop sufficient power for operating the electrical equipment on a car.

Gear drives have been recently developed for axle-generators which give satisfactory operation when properly installed, the principal disadvantages of the recently developed gear drive being the difficulty encountered in installing the generator and its driving mechanism on a car which has previously been in service. It has been found necessary to provide a special axle, on which a driving gear has been pressed, in order to secure satisfactory operation of a gear drive.

An object of my invention, generally stated, is to provide a driving mechanism for an axle-generator which shall be simple and efficient in operation and which may be readily and economically manufactured and installed.

A more specific object of my invention is to provide a flexible driving mechanism for an axle-generator which may be readily installed on a car that has been in previous service.

Another object of my invention is to provide a flexible driving mechanism for an axle-generator which will permit the selection of numerous speed ratios.

Other objects of my invention will be explained fully hereinafter or will be apparent to those skilled in the art.

According to the preferred embodiment of my invention, the generator for supplying energy to operate the electrical equipment on a railway car is rigidly mounted on the frame of one of the car trucks. The generator is driven from a split pulley on the car axle through V-belts connecting to a pulley mounted on a countershaft that is pivotally mounted on the truck frame. A plurality of springs are provided for biasing the countershaft to maintain the proper belt tension. The counter shaft is flexibly connected to a gear unit, which is enclosed in a housing integral with the generator housing, through a torque shaft, thereby providing sufficient flexibility in the driving mechanism to permit relative movement between its parts. The proper speed of the generator may be obtained by carrying the gear ratio of the gear unit and also by changing the relative size of the pulleys.

For a fuller understanding of the nature and objects of the invention, reference may be had to the following detailed description, taken in conjunction with the accompanying drawings in which:

Figure 1 is a view, partially in plan and partially in section of an axle-generator driving mechanism embodying my invention;

Fig. 2 is a view, partially in section and partially in elevation, the section being taken along the line II—II of Fig. 1;

Fig. 3 is a sectional view, taken along the line III—III of Fig. 4;

Fig. 4 is a view, in side elevation, of the driving mechanism shown in Fig. 1, and Fig. 5 is a view, partially in plan and partially in section, of a modification of a portion of the apparatus shown in Fig. 1.

Referring now to the drawings, the reference character 10 designates an axle-generator, which may be of any type suitable for supplying energy to operate the electrical equipment on a railway car. The generator, illustrated, is provided with a "built-in" exciter 11 of the type disclosed in the copending application of C. F. Jenkins, Serial No. 621,161, filed July 7, 1932 and assigned to the Westinghouse Electric & Manufacturing Company.

As shown, the generator 10 is rigidly mounted on a vertical mounting plate 12 that may be welded or bolted to the exterior of the truck frame 13 of a railway car (not shown). The generator 10 is provided on its side with splined supporting members 14 which are bolted to the mounting plate 12 by means of bolts 17. If desired, a bar 15, which extends between the upper pair of supporting members 14, may be clamped to the mounting plate 12 by means of a clamp 16 of a U-shape, as shown in Fig. 3, thereby preventing the generator from dropping out of place in the event of failure of the mounting bolts 17.

In order that the generator may be driven from a standard car axle, which is tapered, thereby permitting it to be utilized on a previously built car without providing a special axle, a split pulley 21, having a layer of rubber 22 on its inside facing, is securely clamped onto an axle 20 of the car truck.

As shown, the pulley 21 is of a type suitable for utilizing V-belts, which are capable of transmitting more torque and have a longer life than flat belts. If desired, other flexible means of transmitting the torque of the axle, such as chains, may be utilized.

A plurality of V-belts 23 connect the pulley 21 to a similar pulley 24, carried on one end of a counter shaft 25 which rotates in a bearing housing 26. The counter shaft 25 rotates on roller bearings 27 and 28 disposed inside of the housing 26. A chamber 29 is provided between the bearings 27 and 28, which may be packed with sufficient grease for lubricating the bearings for long periods of service.

As shown, particularly in Fig. 2, the bearing housing 26 is pivotally mounted on a supporting member 31, which may be welded to the truck frame 13. The proper tension in the belts 23 is maintained by three coil springs 32, which extend between the supporting member 31 and an arm 33 provided on top of the housing 26. The tension of the springs 32 may be adjusted by nuts 34 if desired, however, the use of a large amount of spring material makes it unnecessary to vary the adjustment of the springs after it is once properly made, as the maximum variation in the position of the pulley 24 does not change the tension maintained by the springs 32.

In the preferred embodiment of my invention, the generator 10 is driven by a torque shaft 35 which extends through the hollow counter shaft 25 and is flexibly connected to the end of the countershaft opposite the pulley 24 by means of a flexible coupling 36 of the sliding gear type. The other end of the torque shaft 35 is connected to the low speed shaft 37 of a gear unit 38, enclosed in a housing 39 which is integral with the housing of the generator 10, by means of a flexible coupling 41 which is similar to the coupling 36. It will thus be seen that the countershaft 25 is permitted to move a limited amount relative to the low speed shaft 37 of the gear unit 38 which drives the generator. The gear couplings 36 and 41 are provided with felt washers 42 and 43, respectively, for retaining lubricant within the couplings.

As previously stated, the gear unit 38 is enclosed in the housing 39. The gear unit comprises a driving gear 44, mounted on the shaft 37, and a pinion 45, mounted on the armature shaft of the generator 10. Since the gear unit is totally enclosed, it may be easily lubricated by placing lubricant in the housing 39. The speed of the generator 10 relative to that of the axle 20 may be varied by changing either the relative size of the pulleys 21 and 24, or the gear ratio of the gear unit 38, or both, thereby permitting the generator to be operated at the proper speed to develop the power required for operating the electrical equipment on a railway car.

In the modification illustrated in Fig. 5, the pulley 24 is mounted directly on a shaft 46 which is carried by the roller bearings 27 and 28 in the housing 26. The shaft 46 is connected to the gear unit shaft 37 through flexible couplings 47 and 48 and a sliding spline 49 disposed between the two couplings, thereby permitting relative movement between the shafts 37 and 46. The bearing housing 26 is pivotally mounted on the truck frame 13 in the manner described hereinbefore and a plurality of springs may be provided to maintain the proper tension on the V-belts.

From the foregoing description it is evident that I have provided a flexible mechanism for driving a generator which may be utilized on a car equipped with a standard railway axle, thereby precluding the necessity of providing a special axle on the car for driving the generator. Furthermore, the generator may be rigidly mounted on the exterior of the car truck in a position in which it is readily accessible for making any necessary repairs to the generator. In view of the double reduction drive provided by the combination of a belt drive and a gear unit, the generator may be operated at a speed to develop sufficient power for operating the electrical equipment on a modern railway car.

Since numerous changes may be made in the above-described construction, and different embodiments of the invention may be made without departing from the spirit and scope thereof, it is intended that all matter contained in the above description or shown in the accompanying drawings shall be interpreted as illustrative and not in a limiting sense.

I claim as my invention:

1. The combination with a vehicle truck and a wheel axle, of a generator rigidly mounted on the exterior of the truck frame, a gear unit enclosed in a housing integral with the generator housing, a driving pulley secured on the axle inside the truck frame, a cylindrical housing pivotally mounted on the truck frame, a countershaft rotatably mounted in said cylindrical housing, means for retaining a lubricant within said cylindrical housing, a driven pulley mounted on the countershaft between the generator and the cylindrical housing, belt means for connecting the pulleys, spring means for maintaining the proper belt tension, a torque shaft for connecting the driven pulley to the gear unit to drive the generator, and a flexible coupling disposed at each end of the torque shaft to permit limited movement between the pulley and the gear unit.

2. The combination with a vehicle truck and a wheel axle, of a generator rigidly mounted on the exterior of the truck frame, a gear unit enclosed in a housing integral with the generator housing, a driving pulley secured on the axle inside the truck frame, a cylindrical housing mounted on the truck frame, a countershaft rotatably mounted in said cylindrical housing, means for retaining a lubricant within said cylindrical housing, a driven pulley mounted on the countershaft between the generator and the cylindrical housing, belt means for connecting the two pulleys, a torque shaft for connecting the countershaft to the gear unit to drive the generator, a flexible coupling for connecting the countershaft to the torque shaft, and a second flexible coupling for connecting the torque shaft to the gear unit.

3. The combination with a vehicle truck and a wheel axle, of a generator rigidly mounted on the truck frame, a gear unit enclosed in a housing integral with the generator housing, a driving pulley clamped on the axle, a cylindrical housing mounted on the truck frame, a hollow countershaft rotatably mounted in said cylindrical housing, means for retaining a lubricant within said cylindrical housing, a driven pulley mounted on the countershaft, belt means for connecting the two pulleys, a torque shaft extending through the hollow countershaft for connecting the countershaft to the gear unit to drive the generator, and flexible couplings interposed between the countershaft and the torque shaft and also between the torque shaft and the gear unit to permit the countershaft to move a limited amount relative to the gear unit.

4. The combination with a vehicle truck and a wheel axle, of a generator rigidly mounted on the truck frame, a gear unit enclosed in a housing integral with the generator housing, a driving pulley clamped on the axle, a cylindrical bearing housing pivotally mounted on the truck frame, a hollow countershaft rotatably mounted in the bearing housing, anti-friction bearings interposed between the countershaft and the bearing housing, said bearing housing having space therein for a lubricant for said bearings, a driven pulley mounted on the countershaft, belt means for connecting the two pulleys, a torque shaft extending through the hollow countershaft for connecting the countershaft to the gear unit to drive the generator, and flexible couplings interposed between the countershaft and the torque shaft and also between the torque shaft and the gear unit to permit the countershaft to move a limited amount relative to the gear unit.

5. The combination with a vehicle truck and a wheel axle, of a generator rigidly mounted on the truck frame, a gear unit enclosed in a housing integral with the generator housing, a driving pulley mounted on the axle, a cylindrical bearing housing pivotally mounted on the truck frame, a hollow countershaft rotatably mounted in the bearing housing, anti-friction bearings interposed between the countershaft and the bearing housing, said bearing housing having space therein for a lubricant for said bearings, a driven pulley mounted on the countershaft, belt means for connecting the two pulleys, spring means for biasing the bearing housing to maintain the proper belt tension, a torque shaft extending through the hollow countershaft for connecting the countershaft to the gear unit to drive the generator, and flexible couplings interposed between the countershaft and the torque shaft and also between the torque shaft and the gear unit to permit the countershaft to move a limited amount relative to the gear unit.

6. The combination with a vehicle truck and a wheel axle of a generator rigidly mounted on the exterior of the truck frame, a driving pulley secured on the axle inside the truck frame, a cylindrical housing pivotally mounted on the truck frame, a countershaft rotatably mounted in said cylindrical housing, means for retaining a lubricant within said cylindrical housing, a driven pulley mounted on the countershaft between the generator and the cylindrical housing, belt means for connecting the pulleys, spring means for maintaining the proper belt tension, a torque shaft for connecting the driven pulley to the generator, and a flexible coupling disposed at each end of the torque shaft to permit limited movement between the pulley and the generator.

WINSTON A. BRECHT.